US010961351B2

(12) United States Patent
Monteil et al.

(10) Patent No.: US 10,961,351 B2
(45) Date of Patent: Mar. 30, 2021

(54) IRON COMPOUND USEFUL AS HYDROSILYLATION, DEHYDROGENATIVE SILYLATION AND CROSSLINKING CATALYST FOR SILICONE COMPOSITIONS

(71) Applicants: ELKEM SILICONES FRANCE SAS, Lyons (FR); UNIVERSITE CLAUDE BERNARD LYON 1, Villeurbanne (FR); CENTRE NATIONAL DE LA RECHERCHE SCIENTIFIQUE-CNRS-, Paris (FR)

(72) Inventors: Vincent Monteil, Lyons (FR); Jean Raynaud, Villeurbanne (FR); Magali Puillet, Lyons (FR); Magali Bousquie, Lyons (FR)

(73) Assignees: ELKEM SILICONES FRANCE SAS, Lyons (FR); UNIVERSITE CLAUDE BERNARD LYON 1, Villeurbanne (FR); CENTRE NATIONAL DE LA RECHERCHE SCIENTIFIQUE-CNRS-, Paris (FR)

( * ) Notice: Subject to any disclaimer, the term of this patent is extended or adjusted under 35 U.S.C. 154(b) by 0 days.

(21) Appl. No.: 16/628,090

(22) PCT Filed: Jul. 5, 2018

(86) PCT No.: PCT/FR2018/051677
§ 371 (c)(1),
(2) Date: Jan. 2, 2020

(87) PCT Pub. No.: WO2019/008279
PCT Pub. Date: Jan. 10, 2019

(65) Prior Publication Data
US 2020/0123325 A1  Apr. 23, 2020

(30) Foreign Application Priority Data

Jul. 5, 2017 (FR) .................... 17 56323

(51) Int. Cl.
| | |
|---|---|
| *C08G 77/08* | (2006.01) |
| *B01J 31/02* | (2006.01) |
| *C08G 77/12* | (2006.01) |
| *C08G 77/20* | (2006.01) |
| *C08L 83/04* | (2006.01) |

(52) U.S. Cl.
CPC .......... *C08G 77/08* (2013.01); *B01J 31/0252* (2013.01); *C08G 77/12* (2013.01); *C08G 77/20* (2013.01); *C08L 83/04* (2013.01); *B01J 2231/323* (2013.01); *B01J 2531/842* (2013.01); *C08L 2312/08* (2013.01)

(58) Field of Classification Search
CPC ...................................................... C08G 77/08
See application file for complete search history.

(56) References Cited

U.S. PATENT DOCUMENTS

2017/0249311 A1  8/2017 Pelleg et al.

FOREIGN PATENT DOCUMENTS

| WO | 01/42258 | 6/2001 |
| WO | 2012/017138 | 2/2012 |
| WO | 2019/008279 | 1/2019 |

OTHER PUBLICATIONS

Dalton Transactions (2018) 47, 3243-47.*
Organometallics (2013) 32 (19) 5581-5588.*
H. Bürger et al., "Silylamido-Derivatives of Iron and Cobalt", Mh. Chem., Bd. 94, 1963.
A. M. Tondreau et al., "Iron Catalysts for . . . Using Tertiary Silanes", Science, vol. 335, No. 6068, Feb. 2, 2012, pp. 567-570, XP055137826.
Jian Yang et al., "Efficient Hydrosilylation of . . . Simple Amide Catalyst", Angew. Chem., 2010, 122, 10384-10386.
R. A. Andersen et al., "Synthesis of Bis . . . Two-Coordinate Transition-Metal Amides", Inorg. Chem. 1988, 27, 1782-1786.
Adam J. Ruddy et al., "(N-Phosphinoamidinate)cobalt-Catalyzed . . . Affords Terminal Selectivity", Chemistry A European Journal Communication, 2014, 20, 13918-13922.
Adam J. Ruddy et al., "(N-Phosphinoamidinate)Iron Pre-Catalysts . . . at Low Loadings", American Chemical Society, Organometallics, 2013, 32, 5581-5588.
Y. Horino et al., Alkene and Diene . . . Lanthanum Tris[bis(trimethylsilyl)amide], Organometallics 2004, 23, 12-14.
Yang Liu et al., "Mode of Activation . . . with Tertiary Silanes", J. Am. Chem. Soc., 2017.
J. Li et al., "Synthesis and Characterization . . . with Primary Amido Ligands", Inorganic Chemistry, 2008, 47, 3468-3470.
Gosink et al., "Synthesis and Structures . . . Metallasiloxanes of Groups 5-7", Organometallics, 1994, 13, 3420-3426.

\* cited by examiner

*Primary Examiner* — Marc S Zimmer
(74) *Attorney, Agent, or Firm* — Clark & Brody LP

(57) ABSTRACT

An object of the present invention is the use of iron compounds as hydrosilylation and dehydrogenative silylation catalysts.

11 Claims, No Drawings

IRON COMPOUND USEFUL AS HYDROSILYLATION, DEHYDROGENATIVE SILYLATION AND CROSSLINKING CATALYST FOR SILICONE COMPOSITIONS

FIELD OF THE INVENTION

The field of the invention is that of reactions between an unsaturated compound and a compound comprising at least one hydrogen atom bound to a silicon atom. It can involve hydrosilylation reactions also called polyadditions and/or dehydrogenative silylation reactions. The invention relates to the use of a new type of catalyst for these reactions. More specifically, the present invention relates to the use of iron compounds as hydrosilylation and dehydrogenative silylation catalysts. These catalysts also serve to harden silicone compositions by crosslinking.

DESCRIPTION OF THE RELATED ART

During a hydrosilylation reaction (also called polyaddition), a compound comprising at least one unsaturation reacts with a compound comprising at least one silyl hydride function, meaning a hydrogen atom bound to a silicon atom. In the case of an alkene type unsaturation this reaction can for example be described by:

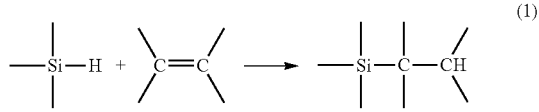

or in the case of an alkyne type unsaturation by:

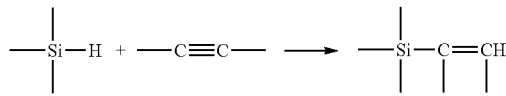

During a dehydrogenative silylation reaction, the reaction can be described by:

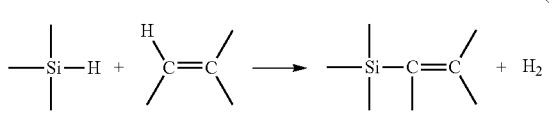

The hydrosilylation reaction is in particular used for cross-linking silicone compositions comprising organopolysiloxanes bearing alkenyl or alkynyl units and organopolysiloxanes comprising silyl hydride functions.

The hydrosilylation of unsaturated compounds is done by catalyst. Typically, the appropriate catalyst for this reaction is a platinum catalyst. Currently, most industrial hydrosilylation reactions are catalyzed by the Karstedt platinum complex, with general formula $Pt_2$(divinyltetramethyldisiloxane)$_3$ (or abbreviated $Pt_2(DVTMS)_3$):

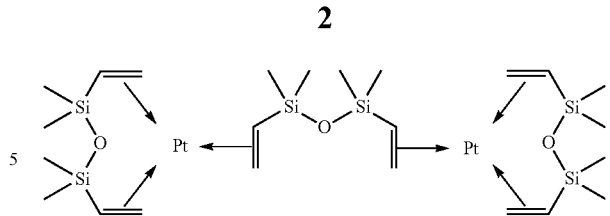

At the beginning of the 2000's, the preparation of platinum-carbene complexes with general formula:

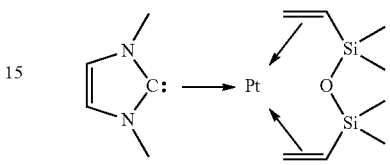

provided access to more stable catalysts (see for example the international patent application WO 01/42258).

However, the use of platinum catalysts is always problematic. It is an expensive metal that is becoming rare and its cost fluctuates enormously. Its industrial scale use is difficult. It would therefore be advantageous to have an alternative to the hydrosilylation reaction catalyzed by platinum. It would be particularly attractive to propose a new type of catalyst for hydrosilylation reactions not containing platinum.

It would therefore be attractive to propose alternative catalysts to the platinum-based catalysts and to have new silicone compositions cross-linkable and/or hardenable by means of catalysts not having the problems described above.

In the past, the use of other catalysts was proposed, for example the use of rhodium or iridium. Just the same, these metals are as rare as platinum, and their use does not resolve the problems mentioned.

The patent application US20140249311 A1 discloses the use of iron-based products as hydrosilylation catalyst. These iron-based products come from a reaction between an iron precursor, which can be $Fe(N(SiMe_3)_2)_2$, and a ligand. These products are next treated by a reducing agent before being used as catalysts. A large number of these iron-based products were tested as hydrosilylation catalysts but only some of them were active. Further, no mention is made of the activity of the catalyst or the selectivity of the reaction.

One of the objectives of the present invention is therefore to propose a method for hydrosilylation and/or dehydrogenative silylation between a compound comprising at least one hydrogen atom bound to one silicon atom and an unsaturated compound, in particular an organopolysiloxane bearing one alkenyl or alkynyl unit, which would use a catalyst that is advantageously low cost, easy to supply, and slightly or nontoxic. Further, it is desired that the hydrosilylation yields obtained with this alternative catalyst be the highest possible. In this context, one of the objectives of the present invention is to propose a new catalyst, suitable in particular for catalyzing hydrosilylation and dehydrogenative silylation reactions, with a sufficient activity for industrial application.

This objective is reached using a catalyst which is an iron compound having a specific structure.

BRIEF DESCRIPTION OF THE INVENTION

These objectives were reached with the implementation of an iron as hydrosilylation and/or dehydrogenative silylation catalyst.

The first object of the present invention is the use of an iron compound of formula (1) as a hydrosilylation and/or dehydrogenative silylation catalyst $$[Fe(N(SiR_3)_2)_x]_y \qquad (1)$$

wherein:
the symbols R, identical or different, represent a hydrogen atom or a hydrocarbon radical having 1 to 12 carbon atoms, and preferably the symbols R, identical or different, are selected from the group consisting of: hydrogen atom, alkyl groups having 1 to 8 carbon atoms and aryl groups having 6 to 12 carbon atoms;
x=1, 2 or 3; and
y=1 or 2.

Further, the object of the invention is also a method for preparing hydrosilylation and/or dehydrogenative silylation products by reaction between an unsaturated compound selected from the organopolysiloxane compounds comprising at least one alkene function and at least one alkyne function, with a compound comprising at least one silyl hydride function, where said method is characterized by the fact that it is catalyzed by an iron compound of formula (1) such as described above.

Another object of the invention is a composition comprising:
at least one unsaturated compound selected from the organopolysiloxane compounds comprising at least one alkene function and/or at least one alkyne function;
at least one compound comprising at least one silyl hydride function; and
an iron compound of formula (1) such as described above.

DETAILED DESCRIPTION OF THE INVENTION

Method

An object of the present invention is therefore a method for preparing hydrosilylation and/or dehydrogenative silylation products by reaction
between an unsaturated compound A selected from the organopolysiloxane compounds comprising units of formula (I):

$$Z_g U_h SiO_{(4-(g+h))/2} \qquad (I)$$

wherein:
the radicals Z, identical or different, represent a linear or branched alkenyl or alkynyl radical having 2 to 6 carbon atoms;
the radicals U, identical or different, represent a hydrocarbon radical having 1 to 12 carbon atoms;
g=1 or 2, h=0, 1 or 2 and g+h=1, 2 or 3;
and possibly comprising other units of formula (II):

$$U_i SiO_{(4-i)/2} \qquad (II)$$

wherein U has the same meaning as above and i=0, 1, 2 or 3;
and a compound B comprising at least one silyl hydride function,
where said method is characterized by the fact that it is catalyzed by an iron compound C of formula (1):

$$[Fe(N(SiR_3)_2)_x]_y \qquad (1)$$

wherein:
the symbols R, identical or different, represent a hydrogen atom or a hydrocarbon radical having 1 to 12 carbon atoms, and preferably the symbols R, identical or different, are selected from the group consisting of: hydrogen atom, alkyl groups having 1 to 8 carbon atoms, cycloalkyl groups having 3 to 8 carbon atoms and aryl groups having 6 to 12 carbon atoms;
x=1, 2 or 3; and
y=1 or 2.

In this formula (1), the iron can have an oxidation level I, II or III.

It is to the inventors' credit to have shown that the compounds C of formula (1) such as described above could effectively catalyze hydrosilylation and/or dehydrogenative silylation reactions.

These catalysts, in particular, have the advantage of not requiring the use of solvents because they have a good solubility in silicone oils.

According to an embodiment of the invention, in the method according to the invention, the compound C is a compound of formula (2):

$$[Fe(N(SiR_3)_2)_2]_y \qquad (2)$$

wherein:
Fe represents iron with oxidation level II and
R is as defined above and
y=1 or 2.

According to a preferred embodiment of the invention, in the method according to the invention, the catalyst C is a compound of formula (3):

$$[Fe(N(Si(CH_3)_3)_2)_2]_y \qquad (3)$$

wherein:
Fe represents iron with oxidation level II and
y=1 or 2.

According to a variant, the compound C of formula (III) above can be synthesized in situ, in the presence of the unsaturated compound A, by quantitative reaction between $FeCl_2$ and $LiN(SiMe_3)_2$.

The unsaturated compound A is selected from the organopolysiloxane compounds comprising units of formula (I):

$$Z_g U_h SiO_{(4-(g+h))/2} \qquad (I)$$

wherein:
the radicals Z, identical or different, represent an alkenyl or alkynyl radical, linear or branched, having 2 to 6 carbon atoms;
the radicals U, identical or different, represent a hydrocarbon radical having 1 to 12 carbon atoms;
g=I or 2, h=0, 1 or 2 and g+h=1, 2 or 3;
and possibly comprising other units of formula (II):

$$U_i SiO_{(4-i)/2} \qquad (II)$$

wherein U has the same meaning as above and i=0, 1, 2 or 3.

In formula (I) and in formula (II) above, it is understood that if several groups U are present, they can be identical or different from each other. In formula (I), the symbol g can preferably be equal to 1.

In formula (I) and in formula (II), U can represent a monovalent radical selected from the group consisting of alkyl groups having 1 to 8 carbon atoms, which could be substituted by at least one halogen atom such as chlorine or fluorine, cycloalkyl groups having 3 to 8 carbon atoms and aryl groups having 6 to 12 carbon atoms. U can advantageously be selected from the group consisting of methyl, ethyl, propyl, 3,3,3-trifluoropropyne, xylyl, tolyl and phenyl.

Said organopolysiloxanes can be oils with dynamic viscosity of order 0.1 to 100,000 MPas at 25° C., generally of order 1 to 70,000 MPas at 25° C., or gums with dynamic viscosity of order 1,000,000 MPas or more at 25° C.

All viscosities discussed in the present disclosure correspond to a dynamic viscosity magnitude at 25° C. called "Newtonian," meaning that the dynamic viscosity is measured, in a well-known way, with the Brookfield viscosity meter at a sufficiently small shearing speed that the measured viscosity is independent of the velocity gradient.

These organopolysiloxanes can have a linear, branched or cyclic structure. Their degree of polymerization is preferably included between 2 and 5000.

When it involves linear polymers, they are essentially composed of siloxyl units "D" selected from the group consisting of siloxyl units $Z_2SiO_{2/2}$, $ZUSiO_{2/2}$ and $U_2SiO_{2/2}$, and siloxyl units "M" selected from the group consisting of siloxyl units $U_3SiO_{1/2}$, $ZU_2SiO)_{1/2}$, $Z_2USiO_{1/2}$ and $Z_3SiO_{1/2}$. The symbols Z and U are as described above.

As examples of the terminal units "M," trimethylsiloxy, dimethylphenylsiloxy, dimethylvinylsiloxy or dimethylhexenylsiloxy groups can be listed.

As examples of units "D," dimethylsiloxy, methylphenylsiloxy, methylvinylsiloxy, methylbutenylsiloxy, methylhexenylsiloxy, methyldecenylsiloxy or methyldecadienylsiloxy can be listed.

Examples of linear organopolysiloxanes which can be unsaturated compounds A according to the invention are:
  a poly(dimethylsiloxane) with dimethylvinylsilyl ends;
  a poly(dimethylsiloxane-co-methylphenylsiloxane) with dimethyl-vinylsilyl ends;
  a poly(dimethylsiloxane-co-methylvinylsiloxane) with dimethyl-vinylsilyl ends; and
  a poly(dimethylsiloxane-co-methylvinylsiloxane) with trimethyl-silyl ends; and
  a cyclic poly(methylvinylsiloxane).

The cyclic organopolysiloxanes that can also be unsaturated compounds A according to the invention are for example those composed of siloxyl units "D" with the following formulas: $Z_2SiO_{2/2}$, $U_2SiO_{2/2}$ or $ZUSiO_{2/2}$, which can be of the dialkylsiloxy, alkylarylsiloxy, alkylvinylsiloxy, and alkylsiloxy type. Said cyclic organopolysiloxanes have a viscosity of order 10 to 5000 MPa·s at 25° C.

According to a preferred embodiment, the method according to the invention can implement a second organopolysiloxane compound comprising, per molecule, at least two $C_2$-$C_6$ alkenyl radicals bonded to the silicon atoms, different from the organopolysiloxane compound A, where said second organopolysiloxane compound is preferably divinyltetramethylsiloxane (DVTMS).

Preferably, the organopolysiloxane compound A has an Si-vinyl unit concentration by mass included between 0.001 and 30%, preferably between 0.01 and 10%.

Silicone resins comprising at least one vinyl radical can be given as other examples of unsaturated compounds A. For example, they can be selected from the group consisting of the following silicone resins:
  $MD^{Vi}Q$ where the vinyl groups are included in the D units,
  $MD^{Vi}TQ$ where the vinyl groups are included in the D units,
  $MM^{Vi}Q$ where the vinyl groups are included in a part of the M units,
  $MM^{vi}TQ$ where the vinyl groups are included in a part of the M units,
  $MM^{Vi}DD^{Vi}Q$ where the vinyl groups are included in the M and D units,
  and mixtures thereof,
wherein:
  $M^{vi}$=siloxyl unit of formula $(R)_2(vinyl)SiO_{1/2}$
  $M^{vi}$=siloxyl unit of formula $(R)(vinyl)SiO_{2/2}$
  T=siloxyl unit of formula $(R)SiO_{3/2}$
  Q siloxyl unit of formula $SiO_{4/2}$
  M=siloxyl unit of formula $(R)_3SiO_{1/2}$
  D=siloxyl unit of formula $(R)_2SiO_{2/2}$
  and the groups R, identical or different, are monovalent hydrocarbon groups selected from the alkyl groups having 1 to 8 carbon atoms included such as methyl, ethyl, propyl and 3,3,3-trifluoropropyl groups and aryl groups such as xylyl, tolyl and phenyl. Preferably the groups R are methyl.

The method according to the invention also implements a compound B comprising at least one silyl hydride function.

Preferably, the compound B comprising at least one silyl hydride function is selected from the group consisting of:
  a silane or polysilane compound comprising at least one hydrogen atom bound to a silicon atom;
  an organopolysiloxane compound comprising at least one hydrogen atom bound to a silicon atom, preferably an organopolysiloxane compound comprising at least two silyl hydride functions per molecule; and
  an organic polymer comprising silyl hydride functions in terminal positions.

In the present invention, "silane" compound is understood to mean chemical compounds comprising an atom of silicon bound to four hydrogen atoms or to organic radicals. In the present invention, "polysilane" compound is understood to mean chemical compounds having at least one unit.

Among the silane compound comprising at least one hydrogen atom bound to a silicon atom, phenylsilane and triethoxysilane can be listed.

The compound B can also be an organopolysiloxane compound comprising at least one hydrogen atom bound to a silicon atom. In the present invention, "organopolysiloxane" compound is understood to mean chemical compounds having at least one unit. The organopolysiloxane compound comprises at least two silicon atoms, preferably at least three silicon atoms or more.

Said compound B can advantageously be an organopolysiloxane comprising at least one unit of formula (III):

$$H_dU_eSiO_{(4-(d+e)/2}$$ (III)

wherein:
  the radicals U, identical or different, represent a hydrocarbon radical having 1 to 12 carbon atoms;
  d=1 or 2, e=0, 1 or 2 and d+e=1, 2 or 3;
and possibly other units of formula (IV):

$$U_fSiO_{(4-f)/2}$$ (IV)

wherein U has the same meaning as above and f=0, 1, 2 or 3.

In formula (III) and in formula (IV) above, it is understood that if several groups U are present, they can be identical or different from each other. In formula (III), the symbol d can preferably be equal to 1. Further, in formula (III) and in formula (IV), U can represent a monovalent radical selected from the group consisting of an alkyl group having 1 to 8 carbon atoms, which could be substituted by at least one halogen atom such as chlorine or fluorine, alkyl groups having 1 to 8 carbon atoms, cycloalkyl groups having 3 to 8 carbon atoms and aryl groups having 6 to 12 carbon atoms. U can advantageously be selected from the group consisting of methyl, ethyl, propyl, 3,3,3-trifluoropropyne, xylyl, tolyl and phenyl.

These organopolysiloxanes can have a linear, branched or cyclic structure. The degree of polymerization is preferably greater than or equal to 2. More generally, it is less than 5000.

When it involves linear polymers, these are essentially composed of:
  siloxyl units "D" selected from units with following formulas $U_2SiO_{2/2}$ or $UHSiO_{2/2}$; and
  siloxyl units "M" selected from units with following formulas $U_3SiO_{1/2}$ or $U_2HSiO_{1/2}$.

These linear organopolysiloxanes can be oils with dynamic viscosity of order 1 to 100,000 MPas and 25° C. and more generally of order 10 to 5000 MPa·s at 25° C.

Examples of organopolysiloxanes that can be compounds B according to the invention comprising at least one hydrogen atom bound to a silicon atom are:
  a poly(dimethylsiloxane) with hydrogendimethylsilyl ends;
  a poly(dimethylsiloxane-co-methylhydrogensiloxane) with trimethylsilyl ends;
  a poly(dimethylsiloxane-co-methylhydrogensiloxane) with hydrogenodimethylsilyl ends;
  a poly(methylhydrogenosiloxane) with trimethylsilyl ends; and
  a cyclic poly(methylhydrogensiloxane).

When it involves cyclic organopolysiloxanes, these are composed of siloxyl units
"D" with following formulas $U_2SiO_{2/2}$ and $UHSiO_{2/2}$, which can be dialkylsiloxy or alkylarylsiloxy type or $UHSiO_{2/2}$ units only. They have a viscosity of order 1 to 5000 MPa·s.

Preferably, the compound B is an organopolysiloxane compound comprising at least two and preferably three silyl hydride functions (Si—H).

The following compounds are particularly suited to the invention as organopolysiloxane compound B:

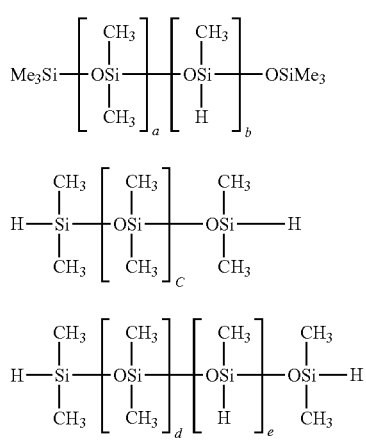

with a, b, c, d and e defined below:
in the polymer of formula S1:
  0≤a≤150, preferably 0≤a≤100, and more specifically 0≤a≤20, and
  1≤b≤90 preferably 10≤b≤80 and more specifically 30≤b≤70,
in the polymer of formula S2: 0≤c≤15
in the polymer of formula S3: 5≤d≤200, preferably 20≤d≤100, and 2≤e≤90, preferably 10≤e≤70.

In particular, an organohydropolysiloxane compound B suited to the invention is the compound of formula S1, where a=0.

Preferably, the organohydropolysiloxane compound B has an Si—H unit concentration by mass included between 0.2 and 91%, preferably between 0.2 and 50%.

Finally, the compound B can be an organic polymer comprising silyl hydride functions in terminal positions. The organic polymer can for example be a polyoxoalkylene, a saturated hydrocarbon polymer or a polymethacrylate. Organic polymers comprising reactive functions in terminal positions are in particular described in the patent applications US 2009/0182099 and US 2009/0182091.

According to a specific embodiment of the present invention, it is possible that the unsaturated compound A and the compound B comprising at least one silyl hydride function are one and the same compound, comprising both at least one alkene function and/or one alkyne function, and also at least one hydrogen atom bound to a silicon atom. This compound can then be qualified as "bifunctional" and it could react with itself by hydrosilylation reaction. The invention can therefore also relate to a method for hydrosilylation of a bifunctional compound with itself, where said bifunctional compound comprises both at least one alkene function and/or one alkyne function and also at least one silicon atom and at least one hydrogen atom bound to the silicon atom, where said method is characterized by the fact that is catalyzed by a compound C such as described above.

Examples of organopolysiloxanes which can be bifunctional compounds are:
  a poly(dimethylsiloxane-co-hydrogenmethylsiloxane-co-vinylmethyl-siloxanes) with dimethylvinylsilyl ends;
  a poly(dimethylsiloxane-co-hydrogenmethylsiloxane-co-vinylmethyl-siloxanes) with dimethylhydrogensilyl ends.

When it is a question of using the unsaturated compound A and the compound B comprising at least one silyl hydride function, the person skilled in the art understands that the use of a bifunctional compound is also understood.

In the method according to the invention, reducing agents other than the compound B comprising at least one silyl hydride function can be used. Metal hydrides like $LiAlH_4$, and metal borohydrides like $NaEt_3BH$ or $LiEt_3BH$ or $NaBH_4$ can be listed as reducing agents. These reducing agents are well known to the person skilled in the art. In another variant, the method according to the invention can use an ionic activator derived from boron like for example the boranes or borates.

Preferably, the method according to the invention does not use ionic reducing agents or activators.

The method according to the invention can be implemented with or without solvent. According to a preferred embodiment, the method according to the invention is implemented without solvent. According to a variant of the invention, one of the reagents, for example the unsaturated compound A, can fill the role of solvent.

The method according to the invention can be implemented at a temperature included between 15° C. and 150° C., preferably between 20° C. and 130° C. and still more preferably between 40° C. and 110° C. The person skilled in the art will know how to adapt the reaction temperature depending on the compounds A and B used in the method according to the invention.

Advantageously, the method from the invention is implemented under inert atmosphere.

In the method according to the invention, the relative quantity of compound A and compound B can be controlled so as to assure the preferred reaction level of the unsaturations with the silyl hydride functions. The molar ratio R of the silyl hydride functions of the compounds B over the alkene and alkyne functions of the compounds A is included between 1:10 and 10:1, preferably between 1:5 and 5:1, for example between 1:3 and 3:1.

According to an embodiment of the method according to the invention, the molar ratio R of the silyl hydride functions of the compounds B over the alkene and alkyne functions of the compounds A is strictly greater than 1. The silyl hydride functions are then in excess relative to the unsaturated functions. In this case, the hydrosilylation process is then qualified as partial. One could also speak of partial functionalization. Partial functionalization can be used for example to get silicone oils with silyl hydride functions and epoxy functions.

According to an embodiment, the molar ratio of the silyl hydride functions of the compounds B over the alkene and alkyne functions of the compounds A is less than or equal to 1. The silyl hydride functions are then insufficient relative to the unsaturated functions.

Advantageously, in the method according to the invention, the molar concentration of compound C is from 0.01% to 15%, preferably from 0.05% to 10%, for example from 0.1% to 4% relative to the total number of moles of unsaturations borne by the unsaturated compound A.

According to another variant, the quantity of iron used in the method according to the invention is included between 10 and 3000 ppm by mass of the reaction medium, preferably between 20 and 2000 ppm, for example between 20 and 1000 ppm. Per reaction medium is understood to mean the sum of the compounds A, B and C, without considering the solvent that could be present.

According to a preferred variant, in the method according to the invention, platinum, palladium, ruthenium or rhodium-based compounds are not used. The quantity of platinum, palladium, ruthenium or rhodium-based compounds in the reaction medium is for example less than 0.1% by weight relative to the weight of the catalyst C, preferably less than 0.01% by weight, and more preferably less than 0.001% by weight.

According to a preferred embodiment of the invention, the compounds A and B used are selected from the organopolysiloxanes such as defined above. In this case, a three-dimensional network forms, which leads to the hardening of the composition. The crosslinking involves a progressive physical change of the medium making up the composition. Consequently, the method according to the invention can be used to get elastomers, gels, foams, etc. In this case a crosslinked silicone material Y results. "Crosslinked silicone material" is understood to mean any silicone-based product resulting from crosslinking and/or hardening of compositions comprising organopolysiloxanes having at least two unsaturated bonds and organopolysiloxanes having at least three silyl hydride units. The crosslinked silicone material Y can for example be an elastomer, gel or foam.

Still according to this preferred embodiment of the method according to the invention, where the compounds A and B are selected from organopolysiloxanes such as defined above, the usual functional additives can be used in the silicone compositions. The following can be listed as families of usual functional additives:
fillers;
adhesion promoters;
hydrosilylation reaction inhibitors or retarders;
adhesion modulators;
silicone resins;
additives for increasing the consistency;
pigments; and
additives for thermal resistance, oil resistance or fire resistance, for example metal oxides.

The fillers which could be provided are preferably minerals. They can notably be siliceous. As it involves siliceous materials, they can play the role of reinforcing or semi-reinforcing filler. The reinforcing siliceous fillers are selected from: colloidal silicas, silica powders from combustion and precipitation, or mixtures thereof. These powders have an average particle size generally less than 0.1 μm and a BET specific surface area over 30 m$^2$/g, preferably included between 30 and 350 m'/g. The semi-reinforcing siliceous fillers such as diatomaceous earth or crushed quartz can also be used. As it relates to non-siliceous mineral materials, they can be involved as semi-reinforcing or filling mineral filler. Some examples of non-siliceous fillers which can be used alone or in mixture are char, titanium dioxide, aluminum oxide, hydrated alumina, expanded vermiculite, unexpanded vermiculite, calcium carbonate which could have surface treatment with fatty acids, zinc oxide, mica, talc, iron oxide, barium sulfate and calcium hydroxide. These fillers have a particle size generally included between 0.001 and 300 μm and a BET surface area less than 100 m$^2$/g. Practically, but without limitation, the fillers used can be a mixture of quartz and silica. The fillers can be treated by any appropriate product. As for the weight, it is preferred to use a quantity of filler included between 1% and 50% by weight, preferably between 1% and 40% by weight relative to the total weight of the constituents of the composition.

Adhesion promoters are widely used in silicone compositions. Advantageously, in the method according to the invention, one or more adhesion promoters can be used selected from the group consisting of:

alkoxyl organosilanes containing, per molecule, at least one $C_2$-$C_6$ alkenyl group, selected from the products with the following general formula:

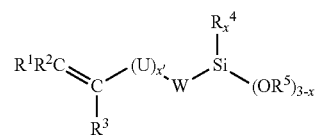

(D.1)

wherein:

$R^1$, $R^2$, $R^3$ are hydrogen or hydrocarbon radicals, identical or different from each other, and represent a hydrogen atom, a linear or branched $C_1$-$C_4$ alkyl or a phenyl which could be substituted with at least one $C_1$-$C_3$ alkyl;

U is a $C_1$-$C_4$ linear or branched alkylene;

W is a valence bond, $R^4$ and $R^5$ are identical or different radicals and represent a linear or branched $C_1$-$C_4$ alkyl;

x'=0 or 1; and x=0 or 2.

the organosiliceous compounds comprising at least one epoxy radical, selected from:

a) the products (D.2a) satisfying the following general formula:

(D.2a)

wherein:

$R^6$ is a linear or branched $C_1$-$C_4$ alkyl radical;

$R^7$ is a linear or branched $C_1$-$C_4$ alkyl radical;

y is equal to 0, 1, 2 or 3; and where X is defined by the following formula:

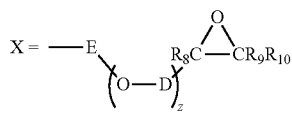

wherein:
E and D are identical or different radicals selected from linear or branched $C_1$-$C_4$ alkyls;
z is equal to 0 or 1;
$R^8$, $R^9$, $R^{10}$ are identical or different radicals representing a hydrogen atom or a linear or branched $C_1$-$C_4$ alkyl; and
$R^8$ and $R^9$ or $R^{10}$ can alternatively form a 5 to 7 member alkyl ring together and with the two epoxy-bearing carbon atoms; or
b) the products (D.2b) constituted of epoxy functional polydiorganosiloxanes comprising:
(i) at least one siloxyl unit of formula (D.2 bi):

$$x_p G_q SiO \frac{4-(p+q)}{2} \qquad (D.2\ bi)$$

wherein:
X is the radical such as defined above for formula (D.2 a)
G is a monovalent hydrocarbon group selected from alkyl groups having 1 to 8 carbon atoms inclusive, which could be substituted by at least one halogen atom, and also from the aryl groups containing between 6 and 12 carbon atoms;
p=1 or 2;
q 0, 1 or 2;
p+q=1, 2 or 3; and
and (ii) could be at least one siloxyl unit of formula (D.2 bii):

$$G_2 SiO \frac{4-r}{2} \qquad (D.2\ bii)$$

wherein:
G has the same meaning as above; and
r is equal to 0, 1, 2 or 3.
the organosiliceous compounds comprising at least one silyl hydride function and at least one epoxy radical; and
chelates of metal M and/or metal alkoxides with general formula:
$M(OJ)_n$, wherein
M is selected from the group formed by: Ti, Zr, Ge, Li, Mn, Fe, Al et Mg or mixtures thereof;
n=valence of M and 1=linear or branched $C_1$-$C_8$ alkyl;
Preferably M is selected from the following list: Ti, Zr, Ge, Li or Mn, and even more preferably the metal M is titanium. A butoxy type alkoxy radical, for example, can be combined with it.
Silicone resins are branched organopolysiloxane oligomers or polymers well known and available in the trade. In the structure thereof, they have at least two different units selected from those of formula $R_3SiO_{1/2}$ (unit M), $R_2SiO_{2/2}$ (unit D), $RSiO_{3/2}$ (unit T) and $SiO_{4/2}$ (unit Q), where at least one of these units is a T or Q unit.
The radicals R are identical or different and are selected from linear or branched $C_1$-$C_6$ alkyl, hydroxyl, phenyl, 3,3,3-trifluoropropyl radicals. As examples of alkyl radicals, methyl, ethyl, isopropyl, tertisobutyl and N-hexyl radicals can be listed.
As examples of branched organopolysiloxane oligomers or polymers, MTQ resins, MTQ resins, TD resins and MDT resins, where the hydroxyl functions can be borne by the M, D and/or T units, can be listed. As examples of resins which are particularly well suited, hydroxyl MTQ resins with a hydroxyl group concentration by weight included between 0.2 and 10% by weight can be listed.
Use as Catalyst
The invention also relates to the use of a compound C of formula (1), (2) or (3) such as defined above as hydrosilylation and/or dehydrogenative silylation catalyst between an unsaturated compound A and a compound B comprising at least one silyl hydride function such as defined above.
According to an embodiment, when the compounds A and B are organopolysiloxanes such as defined above, an object of the invention is also the use of the compound C of formula (1), (2) or (3) such as defined above as crosslinking catalyst for silicone compositions.
Composition
The object of the present invention is also a composition X comprising:
at least one unsaturated compound A selected from the organopolysiloxane compounds comprising units of formula (I):

$$Z_g U_h SiO_{(4-(g+h))/2} \qquad (I)$$

wherein:
the radicals Z, identical or different, represent an alkenyl or alkynyl radical, linear or branched, having 2 to 6 carbon atoms;
the radicals U, identical or different, represent a hydrocarbon radical having 1 to 12 carbon atoms;
g=1 or 2, h=0, 1 or 2 and g+h=1, 2 or 3;
and possibly comprising other units of formula (II):

$$U_i SiO_{(4-i)/2} \qquad (II)$$

wherein U has the same meaning as above and i=0, 1, 2 or 3;
at least one compound B comprising at least one silyl hydride function such as defined above; and
a compound C of formula (1), (2) or (3) such as defined above.
According to another embodiment of the invention, the composition X is a cross-linkable composition comprising:
at least one unsaturated compound A comprising, per molecule, at least two $C_2$-$C_6$ alkenyl radicals bound to silicon atoms and selected from the organopolysiloxane compounds comprising units of formula (1):

$$Z_g U_h SiO_{(4-(g+h))/2} \qquad (I)$$

wherein:
the radicals Z, identical or different, represent a linear or branched alkenyl radical having 2 to 6 carbon atoms;
the radicals U, identical or different, represent a hydrocarbon radical having 1 to 12 carbon atoms;
g=1 or 2, h=0, 1 or 2 and g+h=1, 2 or 3;
and possibly comprising other units of formula (II):

$$U_i SiO_{(4-i)/2} \qquad (II)$$

wherein U has the same meaning as above and i=0, 1, 2 or 3;

at least one organohydrogenpolysiloxane compound B comprising, per molecule, at least two hydrogen atoms, preferably at least three, bound to an identical or different silicon atom; and at least one compound C as defined above.

According to a preferred embodiment of the invention, the composition X according to the invention is a cross-linkable composition, wherein the compound B is selected from the organopolysiloxanes comprising at least one unit of formula (III):

$$H_d U_e SiO_{(4-(d+e))/2} \quad (III)$$

wherein:
the radicals U, identical or different, represent a hydrocarbon radical having 1 to 12 carbon atoms;
d=1 or 2, e 0, 1 or 2 and d+e 1, 2 or 3;
and possibly other units of formula (IV):

$$U_f SiO_{(4-f)/2} \quad (IV)$$

wherein U has the same meaning as above and f=0, 1, 2 or 3.

The compound C can in particular be present in the composition X according to the invention at a concentration ranging from 0.01% to 15%, preferably 0.05% to 10%, for example from 0.1% to 4% by number of moles of $C_2$-$C_6$ alkenyl radicals bound to silicon atoms of the organopolysiloxane compound A.

The composition X according to the invention is preferably free of platinum, palladium, ruthenium or rhodium-based catalyst. "Free" of catalyst other than the catalyst C is understood to mean that the composition X according to the invention comprises less than 0.1% by weight of catalyst other than the catalyst C, preferably less than 0.01% by weight, and more preferably less than 0.001% by rate relative to the total weight of the composition.

According to a specific embodiment, the composition X according to the invention also comprises one or more functional additives usual in silicone compositions. The following can be listed as families of usual functional additives:
fillers;
adhesion promoters;
hydrosilylation reaction inhibitors or retarders;
adhesion modulators;
silicone resins;
additives for increasing the consistency;
pigments; and
additives for thermal resistance, oil resistance or fire resistance, for example metal oxides.

The compositions X according to the invention can in particular be obtained by first adding the compound C to the reaction medium under inert atmosphere and then by adding the compound A under stirring. Finally, compound 13 is inserted and the temperature of the mixture is increased to reach the reaction temperature.

An object of the invention is also a crosslinked silicone material V obtained by heating at a temperature ranging from 15° C. and 150° C., preferably between 20° C. and 130° C., still more preferably between 40° C. and 110° C., a cross-linkable composition X comprising:
at least one unsaturated compound A comprising, per molecule, at least two $C_2$-$C_6$ alkenyl radicals bound to silicon atoms and selected from the organopolysiloxane compounds comprising units of formula (1):

$$Z_g U_h SiO_{(4-(g+h))/2} \quad (I)$$

wherein:
the radicals Z, identical or different, represent an alkenyl or alkynyl radical, linear or branched, having 2 to 6 carbon atoms;

the radicals U, identical or different, represent a hydrocarbon radical having 1 to 12 carbon atoms;
g=1 or 2, h 0, 1 or 2 and g+h=1, 2 or 3;
and possibly comprising other units of formula (II):

$$U_i SiO_{(4-i)/2} \quad (II)$$

wherein U has the same meaning as above and i=0, 1, 2 or 3;
at least one organohydrogenpolysiloxane compound B comprising, per molecule, at least two hydrogen atoms bound to an identical or different silicon atom; and
at least one compound C as defined above.

The present invention is illustrated in more detail in the nonlimiting implementation examples.

EXAMPLES

Reagents
a) A-1 divinyltetramethylsiloxane (DVTMS) with 1.073 moles of vinyl radicals bound to the silicon per 100 g of DVTMS.

A-2 vinylpentamethyldisiloxane (VPDMS) with 0.573 moles of vinyl radicals bound to the silicon per 100 g of VPDMS.

A-3 V100 organopolysiloxane with dimethylvinylsilyl end with about 0.04 moles of vinyl radicals bound to the silicon per 100 g of V100.

b) B-1 Organohydrogenpolysiloxane of formula MD'M with M: $(CH_3)_3SiO_{1/2}$, and D': $(CH_3)HSiO_{2/2}$.

B-2 Organohydrogenpolysiloxane of formula MD'$_{50}$M with M: $(CH_3)_3SiO_{1/2}$, and D': $(CH_3)HSiO_{2/2}$. This corresponds to 1.58 moles of Si—H for 100 g of organohydrogenpolysiloxane.

c) C-1 Iron bis(trimethylsilyl)amide of formula Fe(N(SiMe$_3$)$_2$)$_2$ synthesized according to the operating mode described by Andersen, R. A.; Faegri, K.; Green, J. C.; Haaland, A.; Lappert, M. F.; Leung, W. P.; Rypdal, K. *Inorg. Chem.* 1988, 27 (10), 1782-1786.

Example 1: Hydrosilylation of Divinyltetramethyldisiloxane (DVTMS, A-1) by MD'M (B-1)

Method

The tests were done under inert atmosphere. For all tests, the catalyst is weighed and added to a glass flask under inert atmosphere in a glovebox. Still under inert atmosphere, DVTMS (A-1) is next added and then the compound comprising a silyl hydride bond (MD'M) (2 mol % of catalyst, SiH:SiVi=1:1). Dodecane is also added as internal standard. The molar concentration of catalyst is calculated relative to the total number of moles of unsaturations borne by the unsaturated compound A.

The flask is placed under stirring in an oil bath which will be heated to 90° C.

The reaction medium is analyzed by gas phase chromatography (GPC).

The selectivities in reaction products are expressed in % area relative to the total area of the products formed, determined by GC and GC-MS.

The conversion and selectivity results of hydrosilylation of DVTMS are shown in Tables 1 and 2.

TABLE 1

Conversion of DVTMS and MD'M at 48 hours

|  | Conversion 48 hours |
|---|---|
| MD'M | 41% |
| DVTMS | 92% |

TABLE 2

Reaction selectivity at 48 hours

|  | Selectivity at 48 hours |
|---|---|
| DVTMS hydrogenation | 2% |
| MD'M rearrangement | 0% |
| Hydrosilylation | 36% |
| Dehydrogenative silylation | 9% |
| DVTMS dimerization | 19% |
| Double silylation | 23% |

These results show that iron bis(trimethylsilyl)amide catalyzes the hydrosilylation and the dehydrogenative silylation of DVTMS. This catalyst can therefore be used to catalyze hydrosilylation and dehydrogenative silylation reactions when the unsaturated compound is an organopolysiloxane.

Example 2: Hydrosilylation of Vinylpentamethyldisiloxane (VPDMS, A-2) by MD'M (B-1)

Method

The tests were done identically to example 1 by replacing DVTMS with the PDMS (A-2) and with 0.5 mol % of catalyst. The conversion and selectivity results of hydrosilylation of VPDMS are shown in Tables 3 and 4.

TABLE 3

Conversion of VPDMS and MD'M at 24 hours

|  | Conversion 24 hours |
|---|---|
| MD'M | 20% |
| VPDMS | 28% |

TABLE 4

Reaction selectivity at 24 hours

|  | Selectivity at 24 hours |
|---|---|
| Hydrogenation | 4% |
| MD'M rearrangement | 0% |
| Hydrosilylation | 59% |
| Dehydrogenative silylation | 6% |
| ½ MD'M + HS/DS | 2% |
| VPDMS dimerization | 18% |

These results show that iron bis(trimethylsilyl)amide catalyzes the hydrosilylation and the dehydrogenative silylation of VPDMS. This catalyst is fairly selective for hydrosilylation.

Example 3: Crosslinking of Silicone Compositions: Reaction Between DVTMS (A-1) and Hydrogen Organopolysiloxane (B-2)

Method

The catalyst is weighed in a glovebox, in a closed pill case. Then, the DVTMS A-1 is added and the mixture is stirred for 15 minutes at ambient temperature. Next, the hydrogen organopolysiloxane B-2 is added, the reaction mixture is heated to the desired temperature and the stirring is maintained with a magnetic bar. The molar concentration of catalyst is calculated relative to the total number of moles of unsaturations borne by the unsaturated compound A.

The beginning of crosslinking is defined as being the time necessary for stopping stirring (TSS) due to an increase of the viscosity of the medium is measured.

The parameters from the various tests and the time for stopping stirring results are presented in Table 5.

TABLE 5

Time for stopping stirring (TSS)

| Test | % catalyst | Fe ppm | SiH/SiVi | Temperature | TSS |
|---|---|---|---|---|---|
| 1 | 0.5% | 1750 | 0.9 | 90° C. | TSS = 30 min |
| 2 | 0.5% | 1200 | 2.0 | 90° C. | TSS = 15 min |

These results show that iron bis(trimethylsilyl)amide catalyzes the crosslinking of silicone oils. By increasing the ratio SiH:SiVi, it is possible to get a TSS=15 minutes.

Example 4: Crosslinking of Silicone Compositions: Reaction Between Vinyl Organopolysiloxane V100 (A-3) and Hydrogen Organopolysiloxane (B-2)

Method

The tests were done identically to example 3 by replacing DVTMS with vinyl organopolysiloxane A-3.

The parameters from the various tests and the time for stopping stirring results are presented in Tables 6 and 7. Various temperatures, various catalyst concentrations and various SiH/SiVi ratios were tested.

TABLE 6

Time for stopping stirring (TSS) - Variation of the temperature

| Test | % catalyst | Fe ppm | SiH/SiVi | Temperature | TSS |
|---|---|---|---|---|---|
| 3 | 7.6% | 1650 | 2.1 | 90° C. | TSS = 7-8 hr |
| 4 | 7.9% | 1750 | 2.0 | 110° C. | TSS = 20 hr |
| 5 | 7.4% | 1650 | 1.6 | 70° C. | 24 hr < TSS < 38 hr |

TABLE 7

Time for stopping stirring (TSS) - Variation of the quantity of catalyst and the ratio SiH/SiVi

| Test | % catalyst | Fe ppm | SiH/SiVi | Temperature | TSS |
|---|---|---|---|---|---|
| 6 | 2% | 450 | 2.0 | 90° C. | 10 hr < TSS < 24 hr |
| 7 | 3.5% | 750 | 2.2 | 90° C. | TSS = 9-10 hr |
| 8 | 6.9% | 1500 | 2.3 | 90° C. | TSS = 7-8 hr |
| 9 | 9.8% | 2150 | 1.8 | 90° C. | TSS = 7 hr |
| 10 | 16% | 3500 | 2.1 | 90° C. | TSS = 7 hr |
| 11 | 7.1% | 1500 | 4.0 | 90° C. | TSS = 4-4.5 hr |
| 12 | 3.8% | 800 | 4.1 | 90° C. | TSS = 5-5.5 hr |

These results show that iron bis(trimethylsilyl)amide catalyzes the crosslinking of silicone oils. This crosslinking is effective over a wide temperature range with a variable quantity of catalyst. By increasing the ratio SiH/SiVi, it is possible to get a TSS<5 hr. This compound is therefore a good crosslinking catalyst for silicone compositions.

Example 5: Crosslinking of Silicone Compositions: Reaction Between Vinyl Organopolysiloxane V100 (A-3), DVTMS (A-1) and Hydrogen Organopolysiloxane (B-2)

Method

The tests were done identically to example 4 by adding DVTMS (A-1) in addition to vinyl organopolysiloxane V100 (A-3). The quantity of DVTMS added is expressed in equivalent relative to the quantity of catalyst. The ratio SiH/SiVi is calculated by considering the unsaturations in A-3 and A-1.

The parameters from the various tests and the time for stopping stirring results are presented in Table 8.

TABLE 8

Time for stopping stirring (TSS)

| Test | % catalyst | Eq. DVTMS | Fe ppm | SiH/SiVi | Temperature | TSS |
|---|---|---|---|---|---|---|
| 13 | 4.96% | 3.7 | 1650 | 1.1 | 90° C. | TSS = 6 hr |
| 14 | 3.39% | 8.3 | 1650 | 0.9 | 90° C. | TSS = 3 hr |

These results show that iron bis(trimethylsilyl)amide catalyzes the crosslinking of a mixture silicone oils. By increasing the quantity of DVTMS, it is possible to reduce the TSS.

The invention claimed is:

1. A method for preparing hydrosilylation and/or dehydrogenative silylation products by reaction between:
   an unsaturated compound A selected from the organopolysiloxane compounds comprising units of formula (I):

$$Z_g U_h SiO_{(4-(g+h))/2} \quad (I)$$

wherein:
   the radicals Z, identical or different, represent an alkenyl or alkynyl radical, linear or branched, having 2 to 6 carbon atoms;
   the radicals U, identical or different, represent a hydrocarbon radical having 1 to 12 carbon atoms;
   g=1 or 2, h=0, 1 or 2 and g+h=1, 2 or 3;
   and possibly comprising other units of formula (II):

$$U_i SiO_{(4-i)/2} \quad (II)$$

wherein U has the same meaning as above and i=0, 1, 2 or 3;
   and a compound B comprising at least one silyl hydride function,
   wherein the hydrosilylation and/or dehydrogenative silylation reaction is catalyzed by an iron compound C of formula (1):

$$[Fe(N(SiR_3)_2)_x]_y \quad (1)$$

wherein:
   the symbols R, identical or different, represent a hydrogen atom or a hydrocarbon radical having 1 to 12 carbon atoms, and preferably the symbols R, identical or different, are selected from the group consisting of: hydrogen atom, alkyl groups having 1 to 8 carbon atoms, cycloalkyl groups having 3 to 8 carbon atoms and aryl groups having 6 to 12 carbon atoms;
   x=1, 2 or 3; and
   y=1 or 2.

2. The method according to claim 1, wherein the compound C has formula (2):

$$[Fe(N(SiR_3)_2)_2]_y \quad (2)$$

wherein:
   Fe represents iron with oxidation level II;
   the symbols R, identical or different, represent a hydrogen atom or a hydrocarbon radical having 1 to 12 carbon atoms, and preferably the symbols R, identical or different, are selected from the group consisting of: hydrogen atom, alkyl groups having 1 to 8 carbon atoms, cycloalkyl groups having 3 to 8 carbon atoms and aryl groups having 6 to 12 carbon atoms; and
   y=1 or 2.

3. The method according to claim 1, wherein the compound C has formula (3):

$$[Fe(N(Si(CH_3)_3)_2)_2]_y \quad (3)$$

wherein:
   Fe represents iron with oxidation level II and
   y=1 or 2.

4. The method according to claim 1, wherein the molar concentration of compound C is from 0.01% to 15%, preferably from 0.05% to 10%, for example from 0.1% to 4% relative to the total number of moles of unsaturations borne by the unsaturated compound A.

5. The method according to claim 1 wherein said method does not use platinum, palladium, ruthenium or rhodium-based compounds.

6. The method according to claim 1 wherein the compound B comprising at least one silyl hydride function is selected from the group consisting of:
   a silane or polysilane compound comprising at least one hydrogen atom bound to a silicon atom;
   an organopolysiloxane compound comprising at least one hydrogen atom bound to a silicon atom, preferably an organopolysiloxane compound comprising at least two silyl hydride functions per molecule; and
   an organic polymer comprising silyl hydride functions in terminal positions.

7. The method according to claim 1 wherein the compound B is an organopolysiloxane comprising at least one unit of formula (III):

$$H_d U_e SiO_{(4-(d+e))/2} \quad (III)$$

wherein:
   the radicals U, identical or different, represent a hydrocarbon radical having 1 to 12 carbon atoms;
   d=1 or 2, e=0, 1 or 2 and d+e=1, 2 or 3;
   and possibly other units of formula (IV):

$$U_f SiO_{(4-f)/2} \quad (IV)$$

wherein U has the same meaning as above and f=0, 1, 2 or 3.

8. A composition X comprising:
   at least one unsaturated compound A selected from the organopolysiloxane compounds comprising units of formula (I):

$$Z_g U_h SiO_{(4-(g+h))/2} \quad (I)$$

wherein:
   the radicals Z, identical or different, represent an alkenyl or alkynyl radical, linear or branched, having 2 to 6 carbon atoms;

the radicals U, identical or different, represent a hydrocarbon radical having 1 to 12 carbon atoms;
g=1 or 2, h=0, 1 or 2 and g+h=1, 2 or 3;
and possibly comprising other units of formula (II):

$$U_iSiO_{(4-i)/2} \quad (II)$$

wherein U has the same meaning as above and i=0, 1, 2 or 3;
at least one compound B comprising at least one silyl hydride function; and
a compound C as defined in claim 1.

9. Cross-linkable composition X according to claim 8 comprising:
at least one organopolysiloxane compound A comprising, per molecule, at least two $C_2$-$C_6$ alkenyl radicals bound to silicon atoms;
at least one organohydrogenpolysiloxane compound B comprising, per molecule, at least two hydrogen atoms, preferably at least three, bound to an identical or different silicon atom; and
at least one compound C
of formula (1):

$$[Fe(N(SiR_3)_2)_x]_y \quad (1)$$

wherein:
the symbols R, identical or different, represent a hydrogen atom or a hydrocarbon radical having 1 to 12 carbon atoms, and preferably the symbols R, identical or different, are selected from the group consisting of: hydrogen atom, alkyl groups having 1 to 8 carbon atoms, cycloalkyl groups having 3 to 8 carbon atoms and aryl groups having 6 to 12 carbon atoms;
x=1, 2 or 3; and y=1 or 2.

10. Cross-linkable composition X according to claim 9 wherein the compound B is selected from the organopolysiloxanes comprising at least one unit of formula (III):

$$H_dU_eSiO_{(4-(d+e))/2} \quad (III)$$

wherein:
the radicals U, identical or different, represent a hydrocarbon radical having 1 to 12 carbon atoms;
d=1 or 2, e=0, 1 or 2 and d+e=1, 2 or 3;
and possibly other units of formula (IV):

$$U_fSiO_{(4-f)/2} \quad (IV)$$

wherein U has the same meaning as above and f=0, 1, 2 or 3.

11. A crosslinked silicone material Y obtained by heating at a temperature ranging from 15° C. to 150° C., preferably from 20° C. to 130° C., still more preferably between 40° C. to 110° C., a cross-linkable composition X according to claim 9.

* * * * *